(12) United States Patent
Liu et al.

(10) Patent No.: US 12,553,168 B2
(45) Date of Patent: Feb. 17, 2026

(54) LAUNDRY APPARATUS

(71) Applicants: Qingdao Haier Laundry Electric Appliances Co., Ltd, Shandong (CN); Haier Smart Home Co., Ltd., Shandong (CN)

(72) Inventors: Kai Liu, Qingdao (CN); Sheng Xu, Qingdao (CN); Zhiqiang Zhao, Qingdao (CN)

(73) Assignees: QINGDAO HAIER LAUNDRY ELECTRIC APPLIANCES CO., LTD, Qingdao (CN); HAIER SMART HOME CO., LTD., Qingdao (CN)

( * ) Notice: Subject to any disclaimer, the term of this patent is extended or adjusted under 35 U.S.C. 154(b) by 153 days.

(21) Appl. No.: 18/292,564

(22) PCT Filed: Jun. 17, 2022

(86) PCT No.: PCT/CN2022/099366
§ 371 (c)(1),
(2) Date: Jan. 26, 2024

(87) PCT Pub. No.: WO2023/005493
PCT Pub. Date: Feb. 2, 2023

(65) Prior Publication Data
US 2025/0084577 A1    Mar. 13, 2025

(30) Foreign Application Priority Data
Jul. 28, 2021 (CN) .......................... 202110858007.7

(51) Int. Cl.
*D06F 33/43* (2020.01)
*D06F 23/02* (2006.01)
(Continued)

(52) U.S. Cl.
CPC .............. *D06F 33/43* (2020.02); *D06F 23/02* (2013.01); *D06F 34/14* (2020.02); *D06F 37/266* (2013.01);
(Continued)

(58) Field of Classification Search
CPC ........ D06F 21/02; D06F 23/02; D06F 37/266; D06F 35/008; D06F 33/43; D06F 33/63;
(Continued)

(56) References Cited

U.S. PATENT DOCUMENTS 4,489,574 A * 12/1984 Spendel ............... C11D 3/3951
  68/16
10,151,061 B1 * 12/2018 Farrel ..................... D06F 58/38
2014/0238087 A1 * 8/2014 Bae ....................... D06F 29/005
  68/27

FOREIGN PATENT DOCUMENTS

CN    106521876 A    3/2017
CN    110130053 A    8/2019
(Continued)

OTHER PUBLICATIONS

International Search Report issued on Sep. 1, 2022, in corresponding International Patent Application No. PCT/CN2022/099366, 5 pages.

*Primary Examiner* — David G Cormier
(74) *Attorney, Agent, or Firm* — Maier & Maier, PLLC

(57) ABSTRACT

A laundry apparatus including an outer tub, a window pad, a drainage pump, a valve assembly, and a fan, the drainage pump is in communication with the outer tub by a pump pipe; the valve assembly includes a blocking mechanism and a valve shell having an air intake cavity and an air output cavity; the air intake cavity and the air output cavity are independently arranged; the air intake cavity is in communication with an air intake pipeline which provides communication between the outside and the pump pipe or the
(Continued)

bottom of the outer tub; the air output cavity is in communication with an air output pipeline which provides communication between the outside and the window pad; the fan is arranged on the air intake pipeline and/or the air output pipeline; and the blocking mechanism is configured to simultaneously block the air intake pipeline and the air output pipeline.

7 Claims, 3 Drawing Sheets

(51) Int. Cl.
*D06F 34/14* (2020.01)
*D06F 37/26* (2006.01)
*D06F 39/08* (2006.01)
*D06F 39/12* (2006.01)
*D06F 103/36* (2020.01)
*D06F 105/30* (2020.01)
*D06F 105/32* (2020.01)

(52) U.S. Cl.
CPC ............ *D06F 39/085* (2013.01); *D06F 39/12* (2013.01); *D06F 2103/36* (2020.02); *D06F 2105/30* (2020.02); *D06F 2105/32* (2020.02)

(58) Field of Classification Search
CPC ........ D06F 33/69; D06F 39/06; D06F 39/085; D06F 39/12; D06F 2105/22; D06F 2105/30; D06F 2105/32; D06F 2105/58
See application file for complete search history.

(56) References Cited

FOREIGN PATENT DOCUMENTS

| | | |
|---|---|---|
| CN | 211972793 U | 11/2020 |
| CN | 213740119 U | 7/2021 |
| CN | 215887608 U | 2/2022 |
| JP | 2014014529 A | 1/2014 |
| WO | WO-2015180805 A1 * | 12/2015 ............. D06F 58/38 |

* cited by examiner

LAUNDRY APPARATUS

FIELD

The present disclosure relates to the technical field of clothing washing, and specifically provides a washing apparatus.

BACKGROUND

A washing apparatus is a clothing treatment apparatus that can perform washing, rinsing, spinning and/or drying operations on clothing. Some washing apparatuses are further provided with functions such as air washing, disinfection, sterilization and fragrance enhancement. There are many types of washing apparatuses, such as the most common drum washing machines, pulsator washing machines, and washing-drying integrated machines.

Taking the drum washing machine as an example, an existing drum washing machine includes an outer cylinder and an inner cylinder. During washing, a certain amount of water is first injected into the outer cylinder, and then the inner cylinder drives the clothing to turn over, achieving washing of the clothing. The drum washing machine is designed by imitating the principle of striking the clothing with a bar hammer. After the clothing is washed, the outer cylinder and a window gasket connected to the outer cylinder are both moist, that is, there is residual water on an inner wall thereof. After long term use, growth of bacteria is very likely to occur. In case of only opening door glass to dry the outer cylinder and the window gasket naturally, the effect would be very limited; moreover, the window gasket includes a wrinkle part, which is very unfavorable for the release of water vapor. As the users operating the drum washing machine again, the bacteria and dirt on the inner wall of the outer cylinder and in the window gasket can easily cause a secondary pollution to the clothing, seriously affecting the washing effect and resulting in poor user experience. On the basis of traditional drum washing machines, the washing-drying integrated machines have at least a drying system added thereon, which enables the drum washing machines to have a drying function and some models to further achieve air washing. However, although the drying system can dry the outer cylinder and the window gasket by heating the residual water after the clothing is washed, all the drying systems of the washing-drying integrated machines adopt an internal circulation mode, which makes the water vapor still circulate between a drying air duct and the outer cylinder. Moreover, dehumidification of the washing-drying integrated machine mainly relies on a dehumidification device of the drying system. Therefore, if the residual water in the outer cylinder and the window gasket is to be further removed after a drying program is completed, the drying system has to remain in operation, which will seriously increase energy consumption of the washing machine and is very unfavorable for energy saving.

A drum washing machine is disclosed in the patent No. 201922216894.9, which includes an air inflow pipeline and an air outflow pipeline with a fan. The air inflow pipeline and the air outflow pipeline are both communicated with the outer cylinder, and flowing air can enter the outer cylinder and air dry an inner surface of the outer cylinder and an outer surface of the inner cylinder. The flowing air is then discharged out of the body of the drum washing machine through the air outflow pipeline, that is, the interior of the outer cylinder is air dried by the external air, thus preventing the generation of dirt and growth of bacteria. However, this type of drum washing machine cannot guarantee that external dirt does not enter the drum washing machine, and it still has certain safety hazards.

A vent structure and a washing machine are disclosed in the patent No. 201810106076.0. The vent structure includes a vent and a rotating body. The rotating body is rotatably arranged at the vent, and the rotating body is radially provided with a first connecting hole that penetrates through the rotating body. When the rotating body rotates, the first connecting hole can be communicated with the vent or the rotating body can block the vent, thereby selectively communicating the first connecting hole with the vent, thus achieving the purpose of opening or closing the vent through the rotation of the rotating body. The vent structure can be arranged on a front panel of a housing of the washing machine, or also arranged in a rear vent at the same time. However, when the vent structure is only arranged on the front panel, external dirt can easily enter the drum washing machine from the rear vent. If the vent structure is also arranged in the rear vent at the same time, it is necessary to close both parts of the vent structure respectively to achieve complete blocking of the drum washing machine from the outside, which is very unfavorable for the layout of the product structure and seriously increases the complexity of product design.

Accordingly, there is a need for a new washing apparatus in the art to solve the above problem.

SUMMARY

The present disclosure aims to solve the above technical problem, that is, to solve the problem in the existing washing apparatuses that when external air is used to air dry the outer cylinder, the complicated structure is not advantageous for a simplified design of product structure.

The present disclosure provides a washing apparatus, which includes an outer cylinder, a window gasket, a drainage pump, a valve assembly and a fan; the drainage pump is communicated with the outer cylinder through a pump pipe, and the valve assembly includes a blocking mechanism, and a valve casing with an air inflow chamber and an air outflow chamber that are arranged independently from each other; the air inflow chamber is communicated with an air inflow pipeline that communicates the outside with the pump pipe or with a bottom of the outer cylinder, and the air outflow chamber is communicated with an air outflow pipeline that communicates the outside with the window gasket; the fan is arranged on the air inflow pipeline and/or the air outflow pipeline, and the blocking mechanism is arranged to be capable of blocking the air inflow pipeline and the air outflow pipeline simultaneously.

In a preferred technical solution of the washing apparatus described above, the blocking mechanism includes a driving motor, a first blocking member, and a second blocking member; an output shaft of the driving motor is connected with the first blocking member and the second blocking member simultaneously, the first blocking member is arranged in the air inflow chamber, and the second blocking member is arranged in the air outflow chamber; the driving motor is capable of driving the first blocking member and the second blocking member to move simultaneously, so that the air inflow chamber and the air outflow chamber are blocked.

In a preferred technical solution of the washing apparatus described above, the driving motor is connected with a transmission shaft, the first blocking member is a first blocking plate, and the second blocking member is a second blocking plate; the first blocking plate and the second blocking plate are both arranged on the transmission shaft, and the driving motor can drive the transmission shaft to rotate so that the first blocking plate and the second blocking plate rotate simultaneously.

In a preferred technical solution of the washing apparatus described above, the transmission shaft extends from the outside through one side of the valve casing, the air outflow chamber and the air inflow chamber in sequence, and the transmission shaft is rotatably arranged on a spacer plate that separates the air inflow chamber from the air outflow chamber.

In a preferred technical solution of the washing apparatus described above, the air inflow pipeline includes a first air inflow pipe and a second air inflow pipe, and the fan is arranged on the first air inflow pipe; the first air inflow pipe communicates an air inlet of the air inflow chamber with the outside, and the second air inflow pipe communicates an air outlet of the air inflow chamber with the pump pipe; the air outflow pipeline includes a first air outflow pipe and a second air outflow pipe, the first air outflow pipe communicates the window gasket with an air inlet of the air outflow chamber, and the second air outflow pipe communicates an air outlet of the air outflow chamber with the outside.

In a preferred technical solution of the washing apparatus described above, an opening communicated with the outside is arranged on a front panel of a cabinet of the washing apparatus, and the second air outflow pipe is communicated with the opening.

In a preferred technical solution of the washing apparatus described above, a wind detection device is arranged at the opening.

In a preferred technical solution of the washing apparatus described above, an air inlet of the air inflow chamber and an air outlet of the air inflow chamber are located on opposite sides of the valve casing.

In a preferred technical solution of the washing apparatus described above, an air inlet of the air outflow chamber and an air outlet of the air outflow chamber are located on opposite sides of the valve casing.

In a preferred technical solution of the washing apparatus described above, the air outflow pipeline is communicated with a top of the window gasket.

In case of adopting the above technical solutions, by turning on the fan in the present disclosure after the washing program of the washing apparatus is completed, the external air can enter the air inflow pipeline, then enters the outer cylinder and the window gasket through the pump pipe or the bottom of the outer cylinder to achieve air drying of the interior of the outer cylinder and the window gasket, and finally is discharged from the air outflow pipeline to avoid growth of bacteria inside the outer cylinder and the window gasket due to residual water. In addition, the blocking mechanism can simultaneously block and separate the air inflow pipeline and the air outflow pipeline; the structure is simple, which facilitates the overall structural layout of the product, and reduces the complexity of product design.

Further, the driving motor can drive the first blocking member to block the air inflow chamber, and at the same time drive the second blocking member to block the air outflow chamber, thereby achieving simultaneous blocking of the air inflow pipeline and the air outflow pipeline. That is, the driving motor is used as a driving source to achieve simultaneous blocking of the air inflow pipeline and the air outflow pipeline. The overall structure is simple, which facilitates the overall structural layout of the product, and reduces the complexity of product design.

Further, the driving motor can drive the transmission shaft to rotate, thereby achieving the rotation of the first blocking plate and the second blocking plate, and further achieving simultaneous blocking of the air inflow chamber and the air outflow chamber. Through such an arrangement, not only the air inflow pipeline and the air outflow pipeline can be blocked simultaneously, but also the space that the valve assembly needs to occupy can be reduced as much as possible by means of rotational driving, which is more advantageous for the layout design of the overall spatial structure of the washing apparatus; moreover, the structure is simple and easy to manufacture.

Further, the driving motor is located outside the valve casing, allowing the transmission shaft to protrude into the valve casing to drive the first blocking plate and the second blocking plate to rotate. With such an arrangement, a structural basis is provided for the installation of the structure of the driving motor, and the arrangement of the driving motor outside the valve casing will not affect the flow of air; moreover, there is no safety hazard of the driving motor being covered by humid air, further improving the safety of the washing apparatus.

Further, the wind detection device can detect whether the air outflow pipeline has wind coming out, so that it can be judged whether the wind outflow of the washing apparatus is normal, thereby facilitating users to know the wind outflow status, which is advantageous for the control of the washing apparatus, and further improves the user experience.

Further, the air inlet of the air inflow chamber and the air outlet of the air inflow chamber are located on opposite sides of the valve casing, which is advantageous for the arrangement of the air inflow pipeline, thus reducing the complexity of product design, and facilitating the layout of overall structure.

Further, the air inlet of the air outflow chamber and the air outlet of the air outflow chamber are located on opposite sides of the valve casing, which is advantageous for the arrangement of the air outflow pipeline, thus reducing the complexity of product design, and facilitating the layout of overall structure.

BRIEF DESCRIPTION OF DRAWINGS

Preferred solutions of the present disclosure will be described below with reference to the accompanying drawings and in connection with a drum washing machine. In the drawings.

DETAILED DESCRIPTION

First, it should be understood by those skilled in the art that these embodiments are only used to explain the technical principle of the present disclosure, and are not intended to limit the scope of protection of the present disclosure. For example, although the present disclosure is described in connection with a drum washing machine, the technical principle of the present disclosure is obviously also applicable to a washing-drying integrated machine, or a complex clothing treatment apparatus. Such adjustments or changes to the application object do not constitute limitations to the present disclosure, and should all be defined within the scope of protection of the present disclosure.

It should be noted that in the description of the present disclosure, terms indicating directional or positional relationships, such as "middle", "upper", "lower", "inner", "outer" and the like, are based on the directional or positional relationships shown in the accompanying drawings. They are only used for ease of description, and do not indicate or imply that the device or element must have a specific orientation, or be constructed or operated in a specific orientation; therefore, they should not be considered as limitations to the present disclosure. In addition, terms "first", "second" and "third" are only used for descriptive purpose, and should not be understood as indicating or implying relative importance.

In addition, it should also be noted that in the description of the present disclosure, unless otherwise clearly specified and defined, terms "arrange", "install", "connect" and "communicate" should be understood in a broad sense; for example, the connection may be a fixed connection, or may also be a detachable connection, or an integral connection; it may be a direct connection, or an indirect connection implemented through an intermediate medium, or it may be internal communication between two elements. For those skilled in the art, the specific meaning of the above terms in the present disclosure can be interpreted according to specific situations.

In view of the problem pointed out in the "BACKGROUND OF THE INVENTION" that the existing drum washing machines have a complicated structure when using external air to air dry the outer cylinder, which is not advantageous for a simplified design of product structure, the present disclosure provides a drum washing machine, aiming to improve the air drying effect between the outer cylinder and the inner cylinder, facilitate the overall structural layout of the product, and reduce the complexity of product design.

Figure 1:
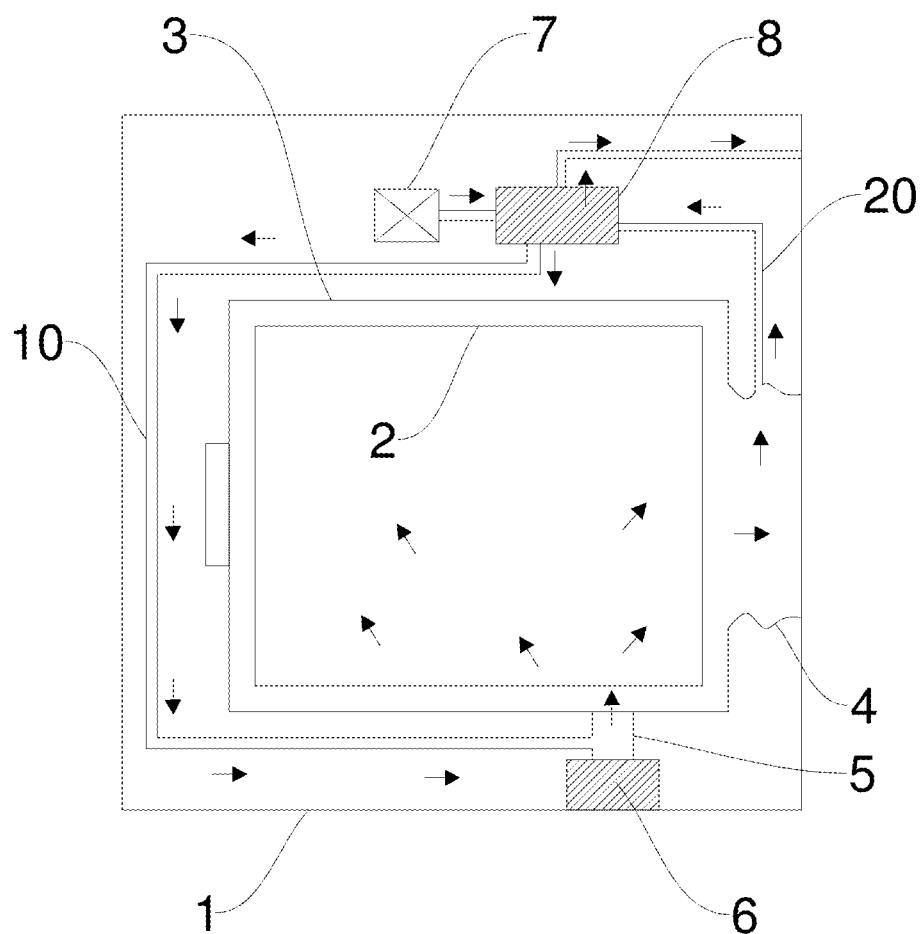
FIG. 1 is a schematic structural view of the drum washing machine of the present disclosure.

Specifically, as shown in FIG. 1, the drum washing machine of the present disclosure includes a cabinet 1 and a cylinder assembly arranged inside the cabinet 1. The cylinder assembly includes an inner cylinder 2, an outer cylinder 3, and a window gasket 4. The inner cylinder 2 is rotatably arranged in the outer cylinder 3, and the window gasket 4 connects an opening of the outer cylinder 3 with a clothing throw-in port of the cabinet 1. The inner cylinder 2 can be directly driven to rotate by a direct driving motor, and can also be driven to rotate by a belt, which is driven by a motor. The outer cylinder 3 is configured to hold washing water, the inner cylinder 2 is configured to turn over the clothing, and the window gasket 4 ensures the sealing between the outer cylinder 3 and the cabinet 1. A bottom of the outer cylinder 3 is communicated with a drainage pump 6 through a pump pipe 5. An outlet of the drainage pump 6 is connected with a drainage pipeline, which can discharge washing water in the outer cylinder 3.

It should be noted that the conventional washing programs of the drum washing machine include washing, rinsing, spinning and draining processes. In some drum washing machines, the spinning process may be omitted from the washing programs. Such adjustments or changes to the conventional washing programs of the drum washing machine do not constitute limitations to the present disclosure, and should all be defined within the scope of protection of the present disclosure. A large amount of foam will be generated during the washing process due to the presence of detergent/washing powder. During the draining process, the drainage pump 6 is turned on, and the water in the outer cylinder 3 is discharged outside of the drum washing machine through the pump pipe 5, the drainage pump 6 and the drainage pipeline in sequence. Moreover, after the draining process is completed, there will be residual water on both an inner surface of the outer cylinder 3 and an inner surface of the window gasket 4.

Figure 2:
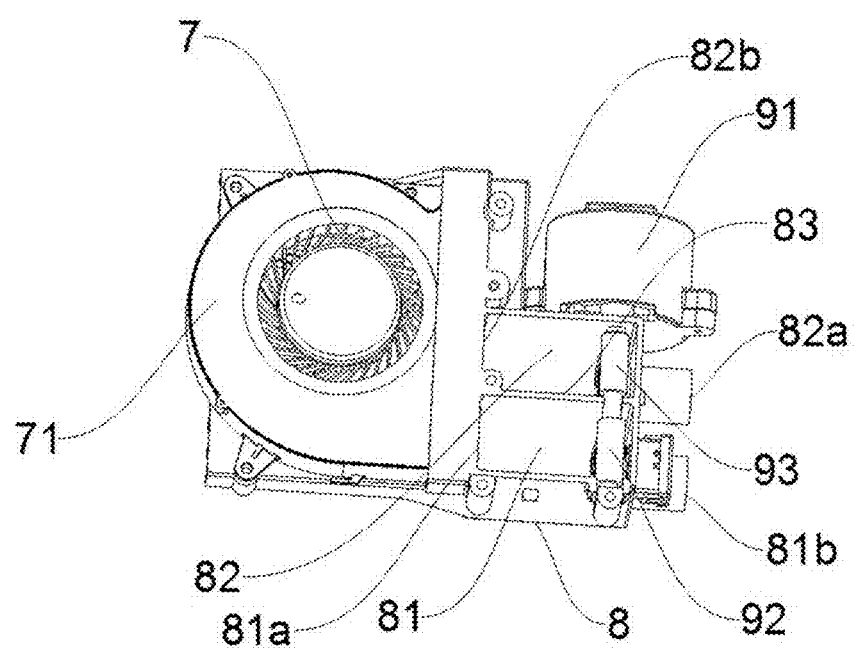
FIG. 2 is a first schematic structural view of a valve assembly and a fan of the drum washing machine of the present disclosure.
Figure 3:
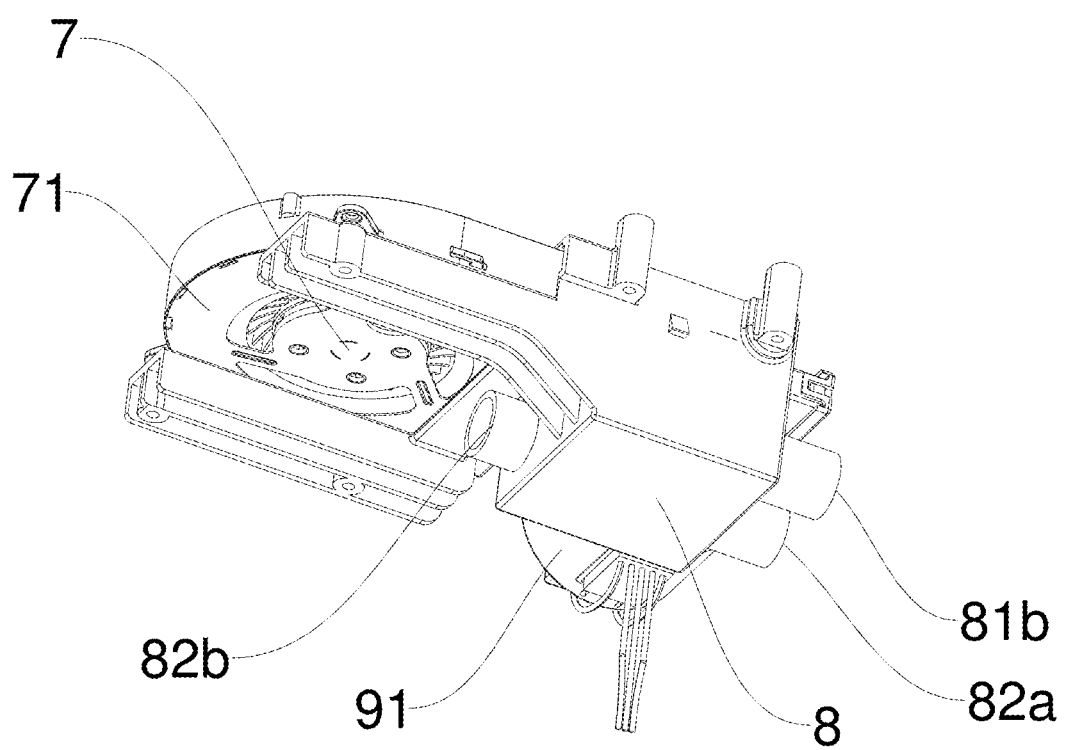
FIG. 3 is a second schematic structural view of the valve assembly and the fan of the drum washing machine of the present disclosure.

As shown in FIGS. 1 to 3, the drum washing machine of the present disclosure further includes a valve assembly and a fan 7. The valve assembly includes a blocking mechanism, and a valve casing 8 with an air inflow chamber 81 and an air outflow chamber 82. The air inflow chamber 81 and the air outflow chamber 82 are arranged independently from each other. The air inflow chamber 81 is communicated with an air inflow pipeline 10 that communicates the outside with the pump pipe 5 or with the bottom of the outer cylinder 3, and the air outflow chamber 82 is communicated with an air outflow pipeline 20 that communicates the outside with the window gasket 4. The fan 7 is arranged on the air inflow pipeline 10 and/or the air outflow pipeline 20, and the blocking mechanism is arranged to be capable of simultaneously blocking the air inflow pipeline 10 and the air outflow pipeline 20. The air inflow chamber 81 has an air inlet 81a and an air outlet 81b, and the air outflow chamber 82 also has an air inlet 82a and an air outlet 82b. Taking the communication between the air inflow pipeline 10 and the pump pipe 5 as an example, when the air inflow chamber 81 is communicated with the air inflow pipeline 10 that communicates the outside with the pump pipe 5, it is possible that the outside is directly communicated with the air inlet 81a of the air inflow chamber 81, and then the air outlet 81b of the air inflow chamber 81 is communicated with the pump pipe 5 through the air inflow pipeline 10, or it is also possible that the air inflow pipeline 10 has two sections, one of which communicates the outside with the air inlet 81a of the air inflow chamber 81, and the other of which communicates the air outlet 81b of the air inflow chamber 81 with the pump pipe 5. Similarly, when the air outflow chamber 82 is communicated with the air outflow pipeline 20 that communicates the outside with the window gasket 4, it is possible that the air outlet 82b of the air outflow chamber 82 is directly communicated with the outside, and then the window gasket 4 is communicated with the air inlet 82a of the air outflow chamber 82 through the air outflow pipeline 20, or it is also possible that the air outflow pipeline 20 has two sections, one of which communicates the window gasket 4 with the air inlet 82a of the air outflow chamber 82, and the other of which communicates the air outlet 82b of the air outflow chamber 82 with the outside. Those skilled in the art can flexibly set the connection position of the air outflow pipeline 20 with the window gasket 4 in practical applications. It is preferred that the air outflow pipeline 20 is communicated with the top of the window gasket 4, so as to prevent water from entering the pipeline during washing of the drum washing machine. In a possible situation, with continued reference to FIG. 1, the air inflow pipeline 10 includes a first air inflow pipe and a second air inflow pipe, and the fan 7 is arranged on the first air inflow pipe; the first air inflow pipe communicates the air inlet 81a of the air inflow chamber 81 with the outside, and the second air inflow pipe communicates the air outlet 81b of the air inflow chamber 81 with the pump pipe 5. The air outflow pipeline 20 includes a first air outflow pipe and a second air outflow pipe, the first air outflow pipe communicates the window gasket 4 with the air inlet 82a of the air outflow chamber 82, and the second air outflow pipe communicates the air outlet 82b of the air outflow chamber 82 with the outside. After the washing program of the drum washing machine is completed, a controller of the drum washing machine can send a signal to the fan 7 to turn on the fan 7. The fan 7 rotates to allow air to enter the pump pipe 5 through the first air inflow pipe, the air inflow chamber 81 and the second air inflow pipe in sequence. After the drainage is completed, the air in the pump pipe 5 will flow toward the outer cylinder 3, and can more easily spread between the outer cylinder 3 and the inner cylinder 2, achieving air drying of the outer cylinder 3 and the inner cylinder 2. Then, since the air outflow pipeline 20 is communicated with the window gasket 4, humid air will be discharged to the outside through the window gasket 4, the first air outflow pipe, the air outflow chamber 82 and the second air outflow pipe in sequence, ensuring that the interior of the window gasket 4 is also air dried.

In the above, the fan 7 is preferably arranged on the first air inflow pipe, so that air can be drawn in from the first air inflow pipe immediately after the fan 7 is turned on. An opening communicated with the outside is arranged on the front panel of the cabinet 1, and the second air outflow pipe is communicated with the opening. Further, a wind detection device is provided at the opening, and the wind detection device can be a flow sensor or another device capable of detecting wind outflow. Through the wind detection device, it can be judged whether the drum washing machine is executing the ventilation program normally. More preferably, a wind humidity sensor is provided at the opening, and an ambient humidity sensor in communication with the controller of the drum washing machine (such as through WiFi, Bluetooth communication, etc.) is arranged in the room. By comparing the ambient humidity detected by the ambient humidity sensor with the wind humidity detected by the wind humidity sensor, if the difference between the humidity detected by the ambient humidity sensor and the humidity detected by the wind humidity sensor is smaller than a preset humidity value (which can be a relative humidity value of 5%), it indicates that the wind humidity is roughly consistent with or close to the ambient humidity, and the drum washing machine can stop executing the ventilation program.

Preferably, as shown in FIGS. 2 and 3, the blocking mechanism includes a driving motor 91, a first blocking member 92, and a second blocking member 93; an output shaft of the driving motor 91 is connected with the first blocking member 92 and the second blocking member 93 simultaneously, the first blocking member 92 is arranged in the air inflow chamber 81, and the second blocking member 93 is arranged in the air outflow chamber 82; the driving motor 91 is capable of driving the first blocking member 92 and the second blocking member 93 to move simultaneously, so that the air inflow chamber 81 and the air outflow chamber 82 are both blocked. The driving motor 91 can be a rotating motor that eventually outputs a rotational force, or a linear motor that eventually outputs a linear driving force. For example, in a preferred situation, the driving motor 91 is connected with the transmission shaft, the first blocking member 92 is a first blocking plate, and the second blocking member 93 is a second blocking plate. The first blocking plate and the second blocking plate are both arranged on the transmission shaft, and the driving motor 91 can drive the transmission shaft to rotate so that the first blocking plate and the second blocking plate rotate simultaneously. That is, the driving motor 91 is a rotating motor, and can drive the transmission shaft to rotate. The transmission shaft drives the first blocking plate and the second blocking plate to rotate simultaneously. The air inlet 81a and the air outlet 81b of the air inflow chamber 81 can be located on opposite sides of the air inflow chamber 81 respectively, or on adjacent sides of the air inflow chamber 81 respectively. Similarly, the air inlet 82a and the air outlet 82b of the air outflow chamber 82 can be located on opposite sides of the air outflow chamber 82 respectively, or on adjacent sides of the air outflow chamber 82 respectively. According to the respective arrangement positions of the air inlet and the air outlet of the air inflow chamber 81 as well as the air inlet and the air outlet of the air outflow chamber 82, the ways of blocking of the first blocking plate and the second blocking plate can be set flexibly and respectively. In a preferred situation, as shown in FIGS. 2 and 3, the air outlet 81b of the air inflow chamber 81 and the air inlet 82a of the air outflow chamber 82 are located on the same side of the valve casing 8, that is, the air outlet 81b of the air inflow chamber 81 is located on the same side as the air inlet 82a of the air outflow chamber 82. The driving motor 91 drives the transmission shaft to rotate so that the first blocking plate can cover the air outlet 81b of the air inflow chamber 81, thereby achieving the blocking of the air inflow pipeline 10, and at the same time, the second blocking plate can cover the air inlet 82a of the air outflow chamber 82, thereby achieving the blocking of the air outflow pipeline 20. Moreover, since it is the air outlet 81b of the air inflow chamber 81 and the air inlet 82a of the air outflow chamber 82 that are covered respectively, even if foam is generated in the washing process of the drum washing machine, it will not enter the air outflow chamber 82. Moreover, it is further preferred that one side of the second blocking plate that faces the air inlet 82a of the air outflow chamber 82 is provided with a sealing gasket, so that sealing can also be achieved when the second blocking plate covers the air inlet 82a of the air outflow chamber 82. In other examples, the sealing gasket on the second blocking plate can be replaced with a sealing ring that can correspond to the shape of the air inlet 82a of the air outflow chamber 82.

Preferably, as shown in FIG. 2, the transmission shaft extends from the outside through one side of the valve casing 8, the air outflow chamber 82 and the air inflow chamber 81 in sequence, and the transmission shaft is rotatably arranged on a spacer plate 83 that separates the air inflow chamber 81 from the air outflow chamber 82. In one possible situation, a first through hole is formed on one side of the valve casing 8 that forms the air outflow chamber 82, a second through hole is formed on the spacer plate 83, and the transmission shaft passes through the first through hole and the second through hole in sequence. The part of the transmission shaft that is located between the first through hole and the second through hole (i.e., the part inside the air outflow chamber 82) is connected with the second blocking plate, and the part of the transmission shaft that protrudes out of the second through hole (i.e., the part inside the air inflow chamber 81) is connected with the first blocking plate. In addition, the transmission shaft can be connected with an edge of the first blocking plate and also connected with an edge of the second blocking plate, so that the rotation of the transmission shaft can achieve synchronous swinging of the first blocking plate and the second blocking plate. Moreover, a third through hole can also be provided on a side of the valve casing 8 opposite to the side on which the first through hole is provided, and the protruding end of the transmission shaft can be located in the third through hole. Through such an arrangement, the transmission shaft can be supported by the first through hole, the second through hole and the third through hole altogether, thus improving the stability of the support. The driving motor 91 is located outside the valve casing 8, and it can be connected with the cabinet 1 of the drum washing machine through an installation bracket, or it can be directly welded to the cabinet 1 of the drum washing machine. In other examples, it is also possible that the transmission shaft extends from the outside through one side of the valve casing 8, the air inflow chamber 81 and the air outflow chamber 82 in sequence.

Alternatively, the driving motor 91 is a linear motor, the first blocking member 92 is a first blocking plate, and the second blocking member 93 is a second blocking plate. A first slot communicated with the air inflow chamber 81 and a second slot communicated with the air outflow chamber 82 are respectively formed on the same side of the valve casing 8. The first blocking plate is inserted into and matched with the first slot, and the second blocking plate is inserted into and matched with the second slot. The linear motor can drive the first blocking plate and the second blocking plate to move linearly and synchronously. When it is necessary to block the air inflow chamber 81 and the air outflow chamber 82, the linear motor drives the first blocking plate to be inserted into the air inflow chamber 81 through the first slot so that the first blocking plate blocks the air inlet 81*a* of the air inflow chamber 81 from the air outlet 81*b* of the air inflow chamber 81, and at the same time, the linear motor drives the second blocking plate to be inserted into the air outflow chamber 82 through the second slot so that the second blocking plate blocks the air inlet 82*a* of the air outflow chamber 82 from the air outlet 82*b* of the air outflow chamber 82. In the above, the linear motor can also be replaced with a structure such as a hydraulic cylinder or a pneumatic cylinder.

In a preferred situation, an in-cylinder humidity sensor is provided on the outer cylinder 3, and a detection end of the in-cylinder humidity sensor is located inside the outer cylinder 3 to detect the humidity in the outer cylinder 3. After the drum washing machine finishes washing, the in-cylinder humidity sensor detects the humidity in the outer cylinder 3. When the humidity is larger than a set humidity threshold (e.g., a relative humidity of 100%), it indicates that the interior of the outer cylinder 3 is very humid, and the controller of the drum washing machine can control the drum washing machine to send a prompt to start fresh air or automatically start the fresh air function, so as to air dry the cylinder assembly through external air. The prompt to start fresh air can be a buzzing prompt, or the drum washing machine can communicate and interact with a mobile terminal of the user (such as a mobile phone, a tablet or a smart bracelet) to send prompt information to the mobile terminal of the user. The user can query the prompt information in the APP. Alternatively, the in-cylinder humidity sensor can also be arranged on the window gasket 4, and the detection end of the in-cylinder humidity sensor is located inside the window gasket 4 to detect the humidity in the window gasket 4. The in-cylinder humidity sensor can also be replaced with an odor sensor. The odor sensor can detect the odor in the cylinder assembly, and the controller can judge whether it is a peculiar smell based on the detected odor. If the odor is a peculiar smell, the controller of the drum washing machine can control the drum washing machine to send a prompt to start fresh air or automatically start the fresh air function.

Preferably, as shown in FIGS. 2 and 3, a fan housing 71 of the fan 7 is arranged together with the valve casing 8. For example, there are two support arms on one side of the valve casing 8, and the fan housing 71 of the fan 7 is arranged on these two support arms, with each of the support arms being provided with a threaded hole. The fan housing 71 of the fan 7 is provided with installation lugs corresponding to the support arms, and the installation lugs are formed with threaded holes or through holes at positions corresponding to the threaded holes on each of the support arms. The fan housing 71 of the fan 7 and the support arms are connected together through screws. When the fan 7 is a centrifugal fan 7, an air inlet of the fan housing 71 of the fan 7 is preferably located on a side of the fan housing 71 that is away from the support arms to prevent the support arms from affecting air inflow of the fan 7.

Preferably, an air filtration device can be arranged at the air inlet of the fan housing 71 of the fan 7, and the air filtration device can block dust from entering the fan 7, the outer cylinder 3 and the window gasket 4. The air filtration device may be of a structure of multi layers of equal-efficiency filter screens, or a structure of a combination of primary-efficiency filter screen, medium-efficiency filter screen and high-efficiency filter screen, or another filtration structure, which can be flexibly set by those skilled in the art in practical applications. In practical applications, a communication pipeline that is communicated with the air inlet of the fan housing 71 of the fan 7 can also be provided, and then an inlet of the communication pipeline is arranged on a rear panel of the cabinet 1 to achieve air inflow from the rear side of the cabinet 1 and air outflow from the front side of the cabinet 1.

In the present disclosure, a foam sensor can also be arranged inside the air outflow chamber 82 of the valve casing 8. When the drum washing machine executes the washing program or the rinsing program, the second blocking member 93 covers the air inlet 82*a* of the air outflow chamber 82. If it is detected by the foam sensor that there is foam in the air outflow chamber 82 of the valve casing 8, it indicates that the blocking mechanism has failed to block the foam. Then, the drum washing machine can send an alarm prompt to remind the user to repair the valve assembly or contact the maintenance personnel to repair or replace the valve assembly.

Hitherto, the technical solutions of the present disclosure have been described in connection with the preferred embodiments shown in the accompanying drawings, but it is easily understood by those skilled in the art that the scope of protection of the present disclosure is obviously not limited to these specific embodiments. Without departing from the principles of the present disclosure, those skilled in the art can make equivalent changes or replacements to relevant technical features, and all the technical solutions after these changes or replacements will fall within the scope of protection of the present disclosure.

What is claimed is:

1. A washing apparatus, comprising:
   a cabinet;
   a cylinder assembly arranged inside the cabinet and including an outer cylinder, an inner cylinder, and a window gasket, wherein the inner cylinder is rotatably arranged in the outer cylinder and the window gasket connects an opening of the outer cylinder with a clothing throw-in port of the cabinet;
   a drainage pump, wherein the drainage pump is communicated with the outer cylinder through a pump pipe;
   a valve assembly, wherein the valve assembly comprises a blocking mechanism and a valve casing with an air inflow chamber and an air outflow chamber that are arranged independently from each other; wherein the air inflow chamber is communicated with an air inflow pipeline that communicates an outside of the washing apparatus with the pump pipe or with a bottom of the outer cylinder, and the air outflow chamber is communicated with an air outflow pipeline that communicates the outside with the window gasket; and a fan, wherein the fan is arranged on the air inflow pipeline and/or the air outflow pipeline, wherein the blocking mechanism comprises a driving motor, a first blocking member, and a second blocking member; an output shaft of the driving motor is connected with the first blocking member and the second blocking member simultaneously, the first blocking member is arranged in the air inflow chamber, and the second blocking member is arranged in the air outflow chamber; the driving motor is capable of driving the first blocking member and the second blocking member to move simultaneously, so that the air inflow chamber and the air outflow chamber are blocked;

wherein the driving motor is connected with a transmission shaft, the first blocking member is a first blocking plate, and the second blocking member is a second blocking plate; the first blocking plate and the second blocking plate are both arranged on the transmission shaft, and the driving motor can drive the transmission shaft to rotate so that the first blocking plate and the second blocking plate rotate simultaneously; and wherein the transmission shaft extends from the outside through one side of the valve casing, the air outflow chamber, and the air inflow chamber in sequence, and the transmission shaft is rotatably arranged on a spacer plate that separates the air inflow chamber from the air outflow chamber.

2. The washing apparatus according to claim 1, wherein the air inflow pipeline comprises a first air inflow pipe and a second air inflow pipe, and the fan is arranged on the first air inflow pipe; the first air inflow pipe communicates an air inlet of the air inflow chamber with the outside, and the second air inflow pipe communicates an air outlet of the air inflow chamber with the pump pipe; the air outflow pipeline comprises a first air outflow pipe and a second air outflow pipe, the first air outflow pipe communicates the window gasket with an air inlet of the air outflow chamber, and the second air outflow pipe communicates an air outlet of the air outflow chamber with the outside.

3. The washing apparatus according to claim 2, wherein the opening is arranged on a front panel of the cabinet, and the second air outflow pipe is communicated with the opening.

4. The washing apparatus according to claim 3, wherein a flow sensor is arranged at the opening.

5. The washing apparatus according to claim 1, wherein an air inlet of the air inflow chamber and an air outlet of the air inflow chamber are located on opposite sides of the valve casing.

6. The washing apparatus according to claim 1, wherein an air inlet of the air outflow chamber and an air outlet of the air outflow chamber are located on opposite sides of the valve casing.

7. The washing apparatus according to claim 1, wherein the air outflow pipeline is communicated with a top of the window gasket.

* * * * *